United States Patent [19]
Goddard et al.

[11] Patent Number: 4,610,222
[45] Date of Patent: Sep. 9, 1986

[54] COOLING SYSTEM USING AN OIL-IN-ALCOHOL CONTAINING CONSOLUTE ANTIFREEZE COMPOSITION

[75] Inventors: Errol D. Goddard, Haworth, N.J.; Pak S. Leung, Highland Mills; Paul H. Mohr, Chappaqua, both of N.Y.

[73] Assignee: Union Carbide Corporation, Danbury, Conn.

[21] Appl. No.: 633,445

[22] Filed: Jul. 23, 1984

[51] Int. Cl.$^4$ .............................. F01P 3/00; C09K 5/00
[52] U.S. Cl. .................... 123/41.42; 252/71; 252/73; 252/74; 252/78.5; 252/308; 252/312; 422/15; 568/624; 568/625
[58] Field of Search ............... 252/71, 73, 74, 75, 252/78.5, 308, 312; 422/15; 123/41.54, 41.42; 568/624, 625

[56] References Cited

U.S. PATENT DOCUMENTS

| | | | |
|---|---|---|---|
| 2,677,700 | 5/1954 | Jackson et al. | 568/625 |
| 3,282,846 | 11/1966 | Scott | 252/75 |
| 3,337,496 | 8/1967 | Pines et al. | 252/75 |
| 3,341,469 | 7/1967 | Pines et al. | 252/75 |
| 3,510,436 | 5/1970 | Silverstein et al. | 422/15 |
| 3,757,984 | 9/1973 | Barton | 123/41.54 |
| 4,210,549 | 7/1980 | Hirozawa et al. | 252/75 |
| 4,260,504 | 4/1981 | Tucoulat et al. | 252/73 |
| 4,465,516 | 8/1984 | Danner et al. | 422/15 |

FOREIGN PATENT DOCUMENTS 2530 6/1979 European Pat. Off. .

Primary Examiner—Paul Lieberman
Assistant Examiner—Robert A. Wax
Attorney, Agent, or Firm—D. J. Terminello

[57] ABSTRACT

A method of and apparatus for cooling an internal combustion engine with an oil-in-alcohol containing consolute antifreeze composition.

26 Claims, 2 Drawing Figures

COOLING SYSTEM USING AN OIL-IN-ALCOHOL CONTAINING CONSOLUTE ANTIFREEZE COMPOSITION

FIELD OF THE INVENTION

The present invention relates generally to a system for using an antifreeze, more particularly, to a method of and apparatus for cooling an internal combustion engine with an oil-in-alcohol-containing consolute antifreeze.

CROSS-REFERENCE TO RELATED APPLICATIONS

This application is related to the subject matter of concurrently filed U.S. application Ser. Nos. 633,207 which was abandoned in favor of continuation-in-part application Ser. No. 680,756, filed Dec. 12, 1984, which in turn was abandoned in favor of continuation-in-part application Ser. No. 754,732, filed July 16, 1985; and 633,342 which was abandoned in favor of continuation-in-part application Ser. No. 754,733, filed July 16, 1985.

BACKGROUND OF THE INVENTION

Oil-containing antifreezes are well known in the art. For example, ethylene glycol antifreeze compositions containing mineral oil plus an emulsifier or containing a barium sulfonate oil are well-known and were used commercially in internal combustion engine coolant systems such as those found in automobiles up until the mid-1960's. The oil in these antifreezes provided excellent corrosion inhibition for the antifreezes by coating the metal surfaces of the coolant system with a so-called "magnetic film". However, in concentrate form, these compositions are generally stable only for a very short period of time of perhaps a couple of days or less, after which time they tend to separate into two phases. Moreover, these compositions are not compatible with modern internal combustion engine coolant systems.

With the advent of antifreeze overflow-tanks used to hold the volume expansion of antifreeze in a hot engine coolant system, these rather unstable macroemulsion antifreezes were replaced with other types of antifreezes, since a macroscopic two-phase antifreeze tends to congregate the less dense oil phase in the overflow-tank and the second phase in other parts of the cooling system. For the above described reasons, macroscopic two-phase antifreezes are obsolete and current antifreezes are single phase, most notably the silicone-silicate stabilized antifreezes disclosed in U.S. Pat. Nos. 3,337,496 and 3,341,469.

More recently, homogeneous, visually single-phase antifreezes have been developed and used for internal combustion engine cooling systems from the mid-1960's to the present time, most notably the silicone-silicate stabilized antifreezes disclosed in U.S. Pat. Nos. 3,337,496 and 3,341,469. The silicate in such antifreezes provides excellent metal corrosion inhibition properties for the antifreeze.

There are disadvantages associated with each of the above two types of antifreezes. The "magnetic film" antifreezes lack the ability to remain homogeneous and single phase during storage and during use. The silicone/silicate antifreezes do not provide the oil film layer metal corrosion inhibitor that is so uniquely effective in the magnetic film type of antifreeze.

OBJECTS OF THE INVENTION

It is an object of the present invention to provide a cooling system for an internal combustion engine that affords a combination of the excellent corrosion protection associated with the prior art "magnetic-film" type antifreeze system together with the excellent concentrate solution stability associated with the prior art silicone-silicate stabilized antifreezes.

Other objects will become apparent from a reading of the following detailed specification.

SUMMARY OF THE INVENTION

The internal combustion engine cooling system of this invention provides a metal corrosion inhibiting film from an antifreeze which itself remains microdispersed and apparently homogeneous (i.e., visually single phase or opalescent) under ambient conditions, and is compatible with conventional corrosion inhibitors. Such an antifreeze system is the subject of the present invention, as discussed in detail below.

One aspect of the present invention relates to a method for cooling an internal combustion engine. The method comprises contacting the hot metal portions of an operating internal combustion engine coolant system with an oil-in-alcohol containing consolute antifreeze composition, thereby heating said consolute antifreeze composition to a cloud point of at least about 40° C. and causing at least a part of the oil in said consolute antifreeze composition to become insoluble therein and to separate therefrom and coat metal surfaces of the coolant system with an oil film, thereby imparting a corrosion inhibition property to said antifreeze composition with respect to said metal surfaces by virtue of said film on said metal surface.

As used herein the term "consolute" is intended to describe an antifreeze that is microdispersed or single phase at ambient temperature and two-phase above its cloud point.

In another aspect, the present invention relates to another method for cooling a hot internal combustion engine using a closed circuit heat exchange system including first metal passageways in heat exchange relation with the hot engine and second passageways in heat exchange relation with cooling air, the improvement comprising:

(a) providing an oil-in-alcohol containing consolute antifreeze composition with a cloud point between about 40° C. to about 125° C. in said heat exchange system;

(b) circulating said antifreeze composition through the heated first metal passageways and heating the composition sufficiently to insolubilize and separate oil from the antifreeze composition, and discharging heated two-phase antifreeze from the first metal passageways;

(c) coating said first metal passageways with a portion of the separated oil; thereby forming a metal corrosion inhibiting oil film;

(d) circulating said heated two-phase antifreeze through the cooled second passageways, thereby cooling the two-phase antifreeze and coating said second passageways with another portion of the separated oil, thereby forming another metal corrosion inhibiting oil film;

(e) continuously recirculating said two-phase antifreeze through said first metal passageways and said second passageways; and (f) discontinuing the continuous recirculating of step (e) by turning off the internal combustion engine and cooling said first metal passageways thereby cooling the antifreeze therein sufficiently to at least partially dissolve the separated oil therein to form a microdispersed consolute antifreeze.

In a preferred embodiment, this method employs a consolute antifreeze composition having a cloud point of at least about 65° C. and the heat exchange system includes an "antifreeze reservoir tank" (also referred to herein as an "overflow tank") joined by a tube to said second passageways.

In yet another aspect, the present invention comprises an internal combustion engine cooling system comprising, in combination, a radiator connected by circulating pipe to a cylinder block of an internal combustion engine, said cooling system containing an oil-in-alcohol consolute antifreeze having a cloud point of at least about 40° C. In a preferred embodiment, the antifreeze has a cloud point of at least about 65° C. and an antifreeze reservoir is connected by a tube to the radiator.

DETAILED DESCRIPTION OF THE INVENTION

Figure 1:
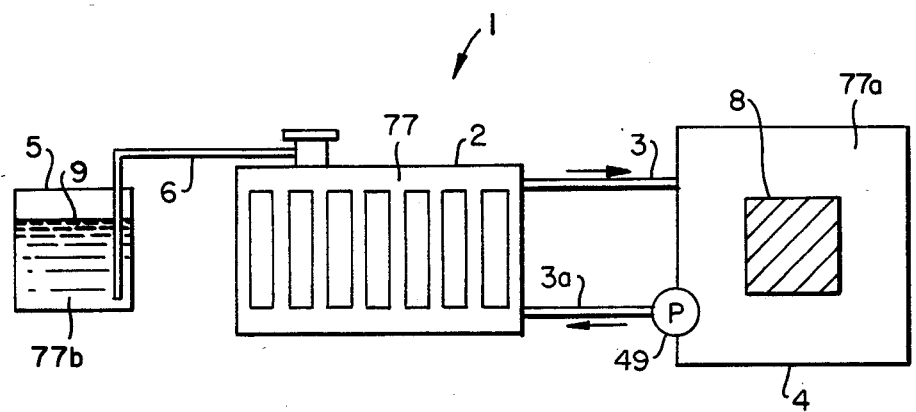
FIG. 1 is a schematic drawing of a non-operating, cold internal combustion engine coolant system filled with consolute antifreeze suitable for practising the method of the present invention.

Heretofore, the use of oil-in-alcohol containing consolute antifreeze compositions in internal combustion engine cooling systems has not been known in the art to the best knowledge of the inventors herein. The advantages associated with the antifreeze in the system of this invention include a microdispersed characteristic at ambient temperature and a visually two-phase characteristic under operating engine temperatures in the internal combustion engine coolant systems. The microdispersed characteristic of the antifreeze at ambient temperature makes it possible for the automotive coolant system overflow reservoir to contain a uniform mixture of all antifreeze ingredients, thereby avoiding the phase congregation problems of the prior art macroemulsion-containing antifreezes when using an overflow reservoir. The two-phase high temperature characteristic of the antifreezes of the present invention facilitates the coating of the metal surfaces of the automotive coolant system with at least a part of the oil portion of the oil-in-alcohol consolute composition, thereby affording the same excellent corrosion characteristics for these metal surfaces as was afforded by the prior art macroemulsion-containing antifreezes.

Two principal classes of oil-in-alcohol consolute antifreeze compositions that are useful in the present invention are microemulsions and pseudo oils. The oil-in-alcohol microemulsions are disclosed and claimed in our co-pending U.S. application Ser. No. 595,421, filed on Mar. 30, 1984, and antifreeze compositions incorporating these oil-in-alcohol compositions are disclosed and claimed in copending U.S. application Ser. No. 633,207. As disclosed in detail in the present specification, these oil-in-alcohol microemulsions are well-suited for use as consolute antifreezes in the method of the present invention. The oil-in-alcohol microemulsions provide a microdispersed ambient temperature characteristic for the antifreeze and a two-phase high temperature characteristic for the antifreeze.

Pseudo oils in antifreeze are the subject of our copending U.S. application Ser. No. 633,342. As used herein, the term "pseudo oil" refers to any material which is essentially soluble in the alcohol of an antifreeze at ambient temperature. The preferred pseudo oil for use in the method of the present invention is polypropylene glycol (PPG). The pseudo oil selected, e.g., polypropylene glycol, must provide a cloud point for the antifreeze at between about 40° C. and about 125° C., preferably at least 65° C. When the cooling system includes an overflow reservoir, the cloud point temperature must be at least about 65° C.

The oil useful in the present invention can be any material known as an "oil", i.e. any of the numerous substances that are liquid or easily liquifiable by warming. The oil is either soluble in (i.e., the pseudo oils) or insoluble or "practically insoluble" in (i.e., the oil in the microemulsions) the "continuous phase" of the present composition. Thus, an essentially or practically insoluble oil is employed in the microemulsions useful in the present invention, whereas a soluble "oil" is employed in the psuedo oil antifreezes of the present invention.

As applied to microemulsions, the term "continuous" or "outer" phase means the alcohol phase that extends through all parts of the microemulsion in a continuous fashion. This outer phase is to be distinguished from the particulate, discontinuous, inner oil phase. As is well recognized, the maximum packing fraction of uniform spheres would make it possible for the outer phase to be as small in amount as 26 vol. % based upon the volume of both phases. Preferably, the outer phase comprises at least 50 wt. % (more preferably at least 90 wt. %) based upon both phases.

As used herein, the term "practically insoluble" means that the amount of oil present exceeds the ordinary solubility limit of the oil in the continuous phase of the composition at ambient temperature (about 20° C.).

The oil useful in the present invention may be obtained from a wide variety of sources, including such diverse sources as animal, vegetable, mineral or synthetic manufacture. Moreover, the composition of the oil is also not critical and can be composed of such diverse materials as predominantly hydrocarbons, such as mineral and petroleum oils, fatty acid esters, fats, silicone oils, polyalkylene oxides and ester derivatives thereof, or mixtures thereof, and the like. The oil phase can also contain one or more additives used to impart certain properties to the microemulsion, such as biocides, oxidation inhibitors, corrosion inhibitors, and the like.

Based upon the above, the term "oil" is intended to include, but is not intended to be limited to, any organic compound which is practically insoluble in alcohol such as ethylene glycol or propylene glycol, or mixtures thereof, but can be emulsified by the use of surfactants. Such oils include non-polar and partially polar, aliphatic and aromatic materials, such as mineral oil, paraffin oil, vegetable oil, naphtha oil, petroleum base oil, mixed xylenes, kerosene, mineral spirit, transformer oil, fuel oil, silicone oil, silane esters, synthetic oil, halogenated oils, polypropylene glycol of molecular weight higher than 1000, propylene oxide/ethylene oxide copolymers, propylene oxide/butylene oxide copolymers, ethylene oxide/butylene oxide copolymers, ethylene oxide/propylene oxide/butylene oxide terpolymers, as well as sulfated, sulfonated, phosphated and phosphonated oils, higher alcohols and esters thereof, and the like.

The amount of oil present in the consolute antifreeze composition useful in the present invention can vary over a wide range but is preferably between about 0.001 to about 5 (more preferably between about 0.1 and about 3) wt. percent based upon the weight of oil plus continuous alcohol phase of the microemulsion or pseudo oil. Below 0.001 wt. %, the amount of oil would generally be insufficient to be functional, whereas above 5 wt. % oil, the antifreeze may not satisfy governmental freezing point depression specifications for vehicular antifreeze.

The emulsifiers useful in preparing the microemulsions useful in the present invention include any of a wide range of anionic surfactants, such as the organophosphates, phosphonates, sulfates and sulfonates, as well as salts of fatty acids; cationic surfactants such as organoammonium and phosphonium salts; and nonionic surfactants such as alkoxylated alcohols, phenols, amines, and fatty acids, and the like; and amphoterics and zwitterionics such as betaines and sulfobetaines, that are well-known in the art.

In general, the total emulsifier concentration present in the microemulsion, if used, should be between about 0.1 times and about 100 times (preferably between about 0.5 times and about 50 times, more preferably between about 2 times and about 10 times) the concentration of oil present in the microemulsion, with the proviso that the total amount of oil plus emulsifier and alcohol cannot exceed 100 wt percent of the microemulsion. When operating below an emulsifier amount of 0.1 times the oil concentration, the microemulsion is likely to be unstable and not remain as a microemulsion prior to and during use. When operating above an emulsifier amount of 100 times the oil concentration, it is likely that resulting composition will not be economically feasible from a commercial standpoint.

When employing a microemulsion in the present invention, at least one emulsifier employed therein must provide a so-called "cloud point", such that the resulting antifreeze will exhibit reverse temperature solubility above ambient temperature and below the operating engine cooling system temperature of the internal combustion engine in which the antifreeze is used. In general, at least one emulsifier employed in the microemulsions useful in the method of the present invention must provide the antifreeze composition with a cloud point at between about 40° C. and about 125° C., preferably between 65° C. and 125° C. The existence of this cloud point makes it possible for the emulsifier possessing this property to "break" the microemulsion over its cloud point temperature range in the operating engine coolant system, thereby allowing the oil to coat the metal surfaces with which it comes in contact. In cooler portions of the engine coolant system, i.e., below the cloud point temperature range of the emulsifier selected, the composition is expected to be in microemulsion form. Re-emulsification of the antifreeze composition components in the engine coolant system, including the optional overflow tank, when the engine is not operating, and thus allowed to cool down, is expected. In contrast, when employing a consolute pseudo oil antifreeze, the pseudo oil must provide the antifreeze with a cloud point between about 40° C. and about 125° C., preferably between 65° C. and 125° C.

A "hydrophobizing" agent containing a metal adsorbing moiety is preferably employed in the method of the present invention to provide an affinity between the metal (e.g. iron, copper, aluminum or solder) surfaces of an internal combustion engine coolant system and the oil from the microemulsion or pseudo oil. Useful hydrophobilizing agents are selected from the group consisting of organic derivatives of the following: phosphate, sulfate, phosphonate, sulfonate, carboxylate, ammonium and phosphonium salts, amine oxides, phosphine oxides amphoteric and zwitterionics such as betaines and sulfobetaines, and mixtures thereof wherein the organic group is selected from the class consisting of the following radicals: alkyl, alkenyl, alkynyl, aryl, all having up to about 24 carbon atoms, alkyleneoxy, polyalkyleneoxy, and combinations thereof.

The amount of hydrophobizer employed in the concentrates of the present invention can vary over a wide range, but is preferably used in an amount of between about 0.001 and about 30 weight percent, more preferably between about 0.005 and about 1, most preferably between about 0.005 and about 0.1, based on the weight of the concentrate. Below the 0.001 weight percent, the amount of hydrophobizer is expected to be insufficient to be effective, whereas above about 30 percent the hydrophobizer is expected to provide no significant further corrosion inhibition benefits.

The preferred hydrophobizers are organophosphates identified by the structural formula:

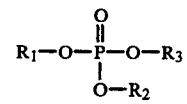

wherein the substituents $R_1$, $R_2$, and $R_3$ are selected from the class consisting of the following radicals: hydrogen; alkyl, aryl, alkenyl and alkynyl, with each of the foregoing having up to about 24 carbon atoms; alkyleneoxy, polyalkyleneoxy; phosphate or polyphosphate or their salts; and combinations thereof; with the proviso that at least one of said substituents is an organic radical within the class listed above or combinations thereof.

The preferred organophosphates have the structural formula identified above wherein at least one R substituent consists of an organic radical containing an alkylene oxide polymer or copolymer derivative of the form $R_4O(PO)_x(EO)_y(BO)_z-$, wherein the alkyleneoxide units may be either random or blocked and wherein $x>y>>z$ and $x+y+z \leq$ about 100, and $R_4$ is selected from the class or radicals: hydrogen; alkyl, aryl, alkenyl and alkynyl with the foregoing having up to about 24 carbon atoms; phosphate, polyphosphate and salts thereof, and combinations thereof. These organophosphates preferably have molecular weights below about 10,000 to insure solubility in the antifreeze composition.

Antifreeze compositions incorporating these preferred hydrophobizing agents are the subject of our co-pending U.S. application Ser. No. 633,210.

Preferred hydrophobizing agents are the organophosphate esters identified by the following formulas I to III, and the free acids and salts thereof, together with mixtures thereof.

-continued

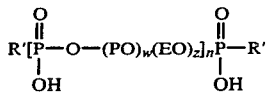
(II)

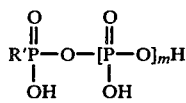
(III)

wherein
$R' = [RO(PO)_x(EO)_y]$ wherein $R = H$ or alkyl, aryl, alkylaryl or arylalkyl having up to 24 carbon atoms
PO = Propylene oxide radical
EO = Ethylene oxide radical
$x = 1$ to $100$
$y = 0$ to $100$
$k = 1$ to $3$, with the provisio that k can be 3 if at least one R' group is removed from the phosphate ester by hydrolysis prior to or during use
$n = 1$ to $100$
$w = 0$ to $100$ with the proviso that when w is $\geq 1$, x can be zero
$z = 0$ to $100$
$m = 1$ to $10$ Within a given formula where x, y, w or z values appear more than once, the values may be the same or different numbers.

Typical useful classes of organophosphates falling within the groups identified by structural formulae I through III above, are identified as follows:

EXAMPLE 1

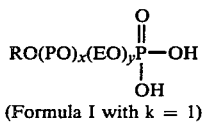
(Formula I with k = 1)

EXAMPLE 2

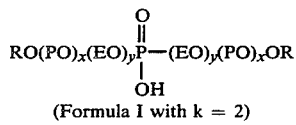
(Formula I with k = 2)

EXAMPLE 3

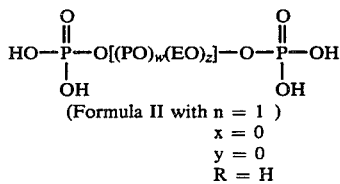
(Formula II with n = 1 )
x = 0
y = 0
R = H

EXAMPLE 4

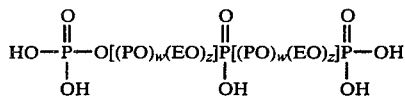

(Formula II with n = 2 )
x = 0
y = 0
R = H

EXAMPLE 5

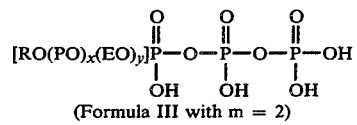
(Formula III with m = 2)

The alcohol useful as the continuous (or outer) phase in the consolute antifreeze composition used in practicing the present invention can be any alcohol selected from the group consisting of methanol, ethanol, propanol, butanol, ethylene glycol, propylene glycol, glycerol, butylene glycol, the monoacetate of propylene glycol, the monoethylether of glycerol, the dimethyl ether of glycerol, sorbitol, 1,2-hexanediol, 1,2,6-hexanetriol, alkoxy alkanols (such as methoxyethanol), trimethylolpropanol, pentaerythritol, and the like and mixtures thereof. The preferred glycol is selected from the group consisting of ethylene glycol, diethylene glycol, propylene glycol, dipropylene glycol and mixtures thereof.

A buffer or mixture of buffers is employed in the antifreeze concentrates and compositions of the present invention. The buffer can be employed in a wide range of amounts, but is preferably used in an amount of between about 0.1 and about 5 wt. percent based on the weight of the concentrate. Below about 0.1 wt. percent, the buffer would not be expected to be effective, whereas above about 5 wt. percent, the amount of buffer is expected to be too costly for a commercial antifreeze. Generally, the buffer helps to maintain a concentrate pH of between about 5.5 and about 11. The preferred buffer is borate, employed to maintain a pH of between about 8 and about 11 for a 33 volume percent of concentrate in water. The borate useful in the composition concentrate of the present invention is conveniently added as the sodium tetraborate pentahydrate salt. This salt is readily commercially available. After adding the salt, addition of sodium hydroxide can be used to provide the desired mixture of metaborates and tetraborates in the concentrate. Among other functions, the buffer serves to provide the desired pH and reserve alkalinity (RA) during use.

Optional additives may be employed in minor amounts of less than 50 wt. percent based on the weight of the consolute antifreeze composition concentrate. Typical optional additives would include, for example, known corrosion inhibitors for aluminum or other metals in admixture with the oils and the hydrophobizing agents of the present invention useful in corrosion inhibition such as, for example, molybdates, sebacates, silicates, borates, phosphates and benzoates, hydroxy benzoates or mixtures thereof, silicones (such as those disclosed in U.S. Pat. No. 3,337,496, incorporated herein by reference), alkali metal nitrates, alkali metal nitrites, diisopropylamine nitrite, dicyclohexylamine nitrate, tolyltriazole, mercaptobenzothiazole, benzotriazole, and the like, or mixtures thereof. If one or more of the known inhibitors are employed together with the inhibitors of the present invention, the sum total of all inhibitors should be used in an "inhibitory effective amount", i.e., an amount sufficient to provide some corrosion inhibition with respect to the metal (e.g. copper, steel, brass, aluminum, etc.) surfaces to be protected. The corrosion inhibitors, if used, can be not only conventional alcohol-soluble inhibitors, but also oil-soluble inhibitors. These oil-soluble corrosion inhibitors are preferred in the practice of this invention and are claimed in microemulsions in our co-pending U.S. application 633,207. Other typical optional additives would include wetting agents and surfactants such as, for example, known ionic and non-ionic surfactants such as the poly(oxyalkylene) adducts of fatty alcohols; antifoams and/or lubricants such as the well-known polysiloxanes and the polyoxyalkylene glycols, as well as any other minor ingredients known in the art that do not adversely affect the aluminum corrosion resistance sought to be achieved.

One minor additive that is particularly preferred in view of the substantial quantities of emulsifier optionally employed in the present method invention is a defoamer. A particularly preferred defoamer is a silicone defoamer, available commercially as SAG employed in amounts of less than 0.1 wt. percent based upon the weight of the microemulsion or pseudo oil composition. Other defoamers are disclosed in U.S. Pat. Nos. 3,340,309, 3,504,041; 3,770,107, and 2,4252755, the disclosures of which are all incorporated herein by reference.

The microemulsions useful in the practice of the present invention can be prepared by any known method such as, for example, by mixing the individual components together for a short period. Another procedure for making a microemulsion is to heat a mixture of the individual ingredients, while stirring, and then allow the resulting microemulsion to cool to room temperature. The sequence of addition of the oil, alcohol, the surfactant, to the consolute antifreeze composition is not critical and the order most convenient may be selected.

Procedures for preparing microemulsions are well known in the art and are more fully described, for example, in "Microemulsion Theory and Practice", Leon M. Prince, Editor (Academic Press, Inc. 1977), the disclosure of which is incorporated herein by reference.

The following example is intended to illustrate, but in no way limit, the scope of the present invention:

EXAMPLE 1

A. Preparation of microemulsion-containing antifreeze concentrate and working antifreeze solutions An oil-in-alcohol microemulsion was prepared by mixing a formulation consisting of 0.2 wt. % paraffin oil, 0.2 wt. % TERGITOL NP-4 (a nonylphenol ethoxylate surfactant of Union Carbide Corporation having 4 average ethoxy units per molecule), and 1.67 wt. % TERGITOL 25-L-7 (a surfactant product of Union Carbide comprising ethoxylates of linear alcohols having an average number of carbons between 12 and 15 and having an average of 7 ethoxy groups per molecule) and 0.5 wt. percent of GAFAC RB-400, an ethoxylated alkyl phosphate of GAF Corporation, together in a borate-containing ethylene glycol base fluid (Base Fluid A). The resulting composition (hereinafter "Test Solution #1") was clear and bright in appearance.

Base Fluid A (hereinafter "Test Solution #2") had the following composition:

| BASE FLUID A | |
|---|---|
| COMPONENT | WT. % |
| ethylene glycol | 98.26 |
| sodium tetraborate pentahydrate | 1.47 |
| sodium hydroxide (50% aq.) | 0.27 |
| Total wt % | 100.00 |

The above microemulsion concentrate was diluted to make a working antifreeze solution by mixing 33 wt. % of concentrate with 67 wt. % of "corrosive water" (deionized water containing 100 ppm. each of $SO_4^=$, $HCO_3^-$ and $Cl^-$, all added as the Na salts). The antifreeze solution was clear and bright in appearance.

B. Laboratory Disc Heat Flux Test: Method, Apparatus and Results

A standard test method used in the antifreeze industry was employed to determine the inhibitory effect of the formulated composition of the present invention with respect to heat rejecting aluminum surfaces. This test method is described in *Corrosion*, 15,257t at 258t (1959) "Laboratory Methods for Determining Corrosion Rates Under Heat Flux Conditions", and also in an ASTM publication entitled, "Engine Coolant Testing: State of the Art," a symposium sponsored by ASTM Committee D-15, at pages 17–19 (Printed, May 1980), both incorporated herein by reference. A summary of the test equipment and procedure follows:

The apparatus consists of a 1 liter flask, fitted with a condenser, a thermometer, a cold finder, a temperature controller, a 1½ inch diameter×¼ inch thick No. 319 aluminum casting alloy (herein "the aluminum disc"), and a soldering iron heat source.

The apparatus was charged with 900 ml. of the working antifreeze solution and heated to effect boiling at the aluminum disc surface and to maintain a solution temperature of about 80° C. The test duration was 168 hours. The weight loss of aluminum from the aluminum disc was determined and used as a measure of corrosion inhibitor effectiveness expressed as % inhibition.

The results are given in Table I which follows:

TABLE I

| Test Solution # | % Inhibition | Wt. Loss |
|---|---|---|
| 1 | 95% | 3 mg. |
| 2 (control) | 0% | 60 mg. |

The results presented in Table I above show very good corrosion inhibition associated with Test Solution #1 of the present invention, as compared to control Test Solution #2 (BASE FLUID only) (95% versus 0% inhibition, respectively).

EXAMPLE 2

In order to demonstrate the present method using a microemulsion-containing antifreeze, a 1982 Chevrolet Citation automobile, equipped with a V-6 engine and having a 10.6 liter nominal cooling system and a thermostat set at 195° F., was tested on a car coolant system described as follows.

As shown in FIG. 1, the car coolant system included radiator (2) attached by pipes (3, 3a) to engine block cooling jacket (4) enclosing engine block (8). Antifreeze is circulated from radiator (2) to engine block cooling jacket (4) by means of pump (49). Also attached to radiator (2) is antifreeze reservoir tank (5) connected to radiator (2) by means of overflow tube (6).

The car's coolant system (1) as shown in FIG. 1 was filled with an antifreeze (77, 77a, 77b) containing a 50:50 mixture of antifreeze Concentrate A and tap water, where antifreeze Concentrate A is defined in Table II below.

TABLE II

|  | Wt. % |
|---|---|
| Ethylene Glycol | 92.2693 |
| Transformer Oil* | 0.9975 |
| TERGITOL NP-4 | 0.9975 |
| TERGITOL 25-L-12 | 3.7406 |
| Water, distilled | 1.9950 |
|  | 100.0000 |

*Transformer oil #600, a mineral oil having a viscosity of 57 S.S.U. at 70° F., a product of Texaco Corp.

As shown in FIG. 1, the non-operating, cold coolant system (1) consisted of radiator (2) filled with antifreeze (77, 77a, 77b) and connected by circulating pipes (3, 3a) to engine block cooling jacket (4) containing antifreeze and engine block (8). Radiator (2) is connected by overflow tube (6) to antifreeze reservoir tank (5) filled to level line (9) with antifreeze (77b).

Figure 2:
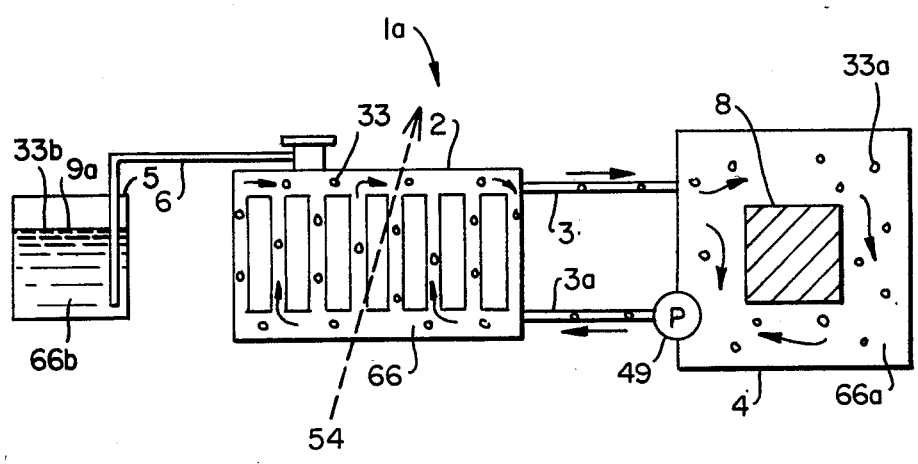
FIG. 2 is a schematic drawing of an operating, hot internal combustion engine coolant system employing the method of the present invention.

As shown in FIG. 2, the hot operating internal combustion engine coolant system (1a) contains two-phase antifreeze (66, 66a) having discrete oil droplets (33, 33a) dispersed therein. In FIG. 2, overflow tank (5) is filled to level line 9a with antifreeze 66b.

The car containing the above 50 percent aqueous antifreeze (66, 66a, 66b) was tested over an 11 day period by cycling the engine through thirty nine complete on/off cycles and driving the car over 303 miles. The original 50 percent aqueous antifreeze had an oil-containing phase of 12.7 volume percent. After twenty four complete engine on-off cycles, the oil-containing phase in the overflow tank of the coolant system was 12.5 volume percent. After thirty two complete cycles, the overflow tank had an oil-containing phase of 10.8 volume percent, as compared to an oil phase content of 10.5 volume percent in the bulk engine fluid. After thirty nine complete cycles, the overflow tank had an oil phase content of 10.8 volume percent, and the oil phase content of the bulk engine fluid was 10.6 volume percent.

The above test results indicate clearly that an oil content equilibrium between the bulk engine fluid and the overflow tank was reached after a number of on-off cycles of the engine and that a microemulsion-antifreeze having a cloud point of 77° C. did not aggregate the oil phase in either the main coolant system or in the overflow tank.

A similar car test was conducted using a microemulsion-containing antifreeze composition having a cloud point of about 60° C. Complete re-microemulsification of this antifreeze in the coolant system did not take place when the system was cooled down. Also, the oil distribution in the antifreeze was not uniform in the various parts of the system on cool down. However, the cooling system tested included an antifreeze reservoir tank. Without a reservoir tank, it is expected that complete re-microemulsification would occur upon engine start-up, provided that the antifreeze has a cloud point of between about 40° C. and about 125° C. When using an antifreeze with a cloud point within this range, a visually single phase is expected at ambient temperature.

FIG. 2 also illustrates the cooling method of this invention wherein first metal passageways (4) are in heat exchange relation with the hot engine (8), and second metal passageways (2) are in heat exchange relation with cooling air (54) during engine operation. Since the system includes antifreeze reservoir tank (5), the cloud point should be at least 65° C. The antifreeze is circulated through the heated first metal passageways (4) and is heated sufficiently to insolubilize and separate oil from the antifreeze. The heated two phase antifreeze is discharged from heated first metal passageways (4), and the latter are coated with a portion of the separated oil thereby forming a metal corrosion inhibiting oil film.

The heated two phase antifreeze is circulated through the air-cooled second metal passageways (2), thereby cooling the two-phase antifreeze and coating passageways (2) with another portion of the separated oil as a metal corrosion inhibiting oil film. Thereafter, the antifreeze is continuously recirculated through the first metal passageways (4) and second passageways (2) until engine (8) is turned off. At that time, said first metal passageways (4) are cooled down, thereby cooling the antifreeze therein sufficiently to at least partially dissolve the separated oil in said first metal passageways and resolubilize the dissolved oil into the consolute antifreeze.

While this invention has been described with reference to certain specific embodiments, it will be recognized by those skilled in this art that many variations are possible without departing from the scope and spirit of the invention and that it is intended to cover all changes and modifications of the invention disclosed herein for the purposes of illustration which do not constitute departure from the spirit and scope of the invention.

I claim:

1. A method of cooling an internal combustion engine which comprises contacting hot metal portions of an operating internal combustion engine coolant system with an oil-in-alcohol containing consolute antifreeze composition thereby raising the temperature of said antifreeze to at least a cloud point of about 40° C., thereby causing the oil in said consolute antifreeze composition to become insoluble therein and to separate therefrom and coat metal surfaces of the coolant system with an oil film, thereby imparting a corrosion inhibition property to said antifreeze composition with respect to said metal surfaces.

2. The method of claim 1 wherein said antifreeze composition additionally contains at least one hydrophobizing agent selected from the group consisting of organic derivatives of the following: phosphate, sulfate, phosphonate, sulfonate, carboxylate, ammonium and phosphonium salts, amine oxides, phosphine oxides, amphoteric and zwitterionics such as betaines and sulfobetaines, and mixtures thereof wherein the organic group is selected from the class consisting of the following radicals: alkyl, alkenyl, alkynyl, aryl, all having up to about 24 carbon atoms, alkyleneoxy, polyalkyleneoxy, and combinations thereof.

3. The method of claim 1 wherein said alcohol in said antifreeze composition is selected from the group consisting of ethylene glycol, propylene glycol, diethylene glycol, dipropylene glycol, and mixtures thereof.

4. A method of cooling an internal combustion engine which comprises contacting hot metal portions of an operating internal combustion engine coolant system with an oil-in-alcohol containing consolute antifreeze composition thereby raising the temperature of said antifreeze to at least a cloud point of about 40° C., thereby causing the oil in said consolute antifreeze composition to become insoluble therein and to separate therefrom and coat metal surfaces of the coolant system with an oil film, thereby imparting a corrosion inhibition property to said antifreeze composition with respect to said metal surfaces, wherein said antifreeze composition is a microemulsion and additionally contains an emulsifier providing a cloud point between 40° C. and 125° C. for the antifreeze composition.

5. A method of cooling an internal combustion engine which comprises contacting hot metal portions of an operating internal combustion engine coolant system with an oil-in-alcohol containing consolute antifreeze composition thereby raising the temperature of said antifreeze to at least a cloud point of about 40° C., thereby causing the oil in said consolute antifreeze composition to become insoluble therein and to separate therefrom and coat metal surfaces of the coolant system with an oil film, thereby imparting a corrosion inhibition property to said antifreeze composition with respect to said metal surfaces, wherein said antifreeze composition is a microemulsion and additionally contains an emulsifier providing a cloud point between 40° C. and 125° C. for the antifreeze composition, and wherein said oil in said antifreeze composition is present in an amount of between about 0.001 and about 5 wt. percent based on the weight of the composition and wherein said emulsifier is present in an amount of between about 0.1 times and about 100 times the total weight of said oil in the composition, and wherein said alcohol is present in an amount of at least about 50 wt. percent based on the weight of the composition, with the proviso that the total weight of the concentrate not exceed 100 wt. percent.

6. A method of cooling an internal combustion engine which comprises contacting hot metal portions of an operating internal combustion engine coolant system with an oil-in-alcohol containing consolute and antifreeze composition thereby raising the temperature of said antifreeze to at least a cloud point of about 40° C., thereby causing the oil in said consolute antifreeze composition to become insoluble therein and to separate therefrom and coat metal surfaces of the coolant system with an oil film, thereby imparting a corrosion inhibition property to said antifreeze composition with respect to said metal surfaces, wherein said antifreeze composition is a microemulsion and additionally contains an emulsifier providing a cloud point between 40° C. and 125° C. for the antifreeze composition, and wherein said emulsifier consists essentially of non-ionic surfactants.

7. A method of cooling an internal combustion engine which comprises contacting hot metal portions of an operating internal combustion engine coolant system with an oil-in-alcohol containing consolute and antifreeze composition thereby raising the temperature of said antifreeze to at least a cloud point of about 40° C., thereby causing the oil in said consolute antifreeze composition to become insoluble therein and to separate therefrom and coat metal surfaces of the coolant system with an oil film, thereby imparting a corrosion inhibition property to said antifreeze composition with respect to said metal surfaces, wherein said antifreeze composition is a microemulsion and additionally contains an emulsifier providing a cloud point between 40° C. and 125° C. for the antifreeze composition, and wherein said emulsifier consists of a mixture of at least one non-ionic surfactant together with at least one anionic or cationic surfactant.

8. The method of claim 1 wherein said oil in said antifreeze composition has a cloud point between 65° C. and 125° C.

9. The method of claim 2 wherein said hydrophobizing agent is present in an amount of between about 0.001 and about 30 weight percent.

10. The method of claim 2 wherein said hydrophobizing agent is a propylene oxide or ethylene oxide/propylene oxide-containing organophosphate ester.

11. The method of claim 9 wherein said organophosphate ester has an average molecular weight below about 10,000.

12. The method of claim 9 wherein said organophosphate ester is identified by the structural formula:

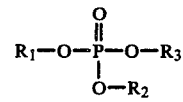

wherein the substituents $R_1$, $R_2$, and $R_3$ are selected from the class consisting of the following radicals: hydrogen; alkyl, aryl, alkenyl and alkynyl, with each of the foregoing having up to about 24 carbon atoms; alkyleneoxy, polyalkyleneoxy; phosphate or polyphosphate or their salts; and combinations thereof; with the proviso that at least one of said substituents is an organic radical within the class listed above or combinations thereof.

13. The method of claim 1 wherein said antifreeze composition has a pH of between about 8 and about 11.

14. The method of claim 1 wherein said antifreeze composition additionally contains silicate in a corrosion-inhibiting effective amount.

15. The method of claim 1 wherein said antifreeze composition additionally contains an antifoam additive in an amount effective to minimize foaming of said concentrate.

16. In a method for cooling a hot internal combustion engine using a closed circuit heat exchange system including first metal passageways in heat exchange relation with the hot engine and second passageways in heat exchange relation with cooling air, the improvement comprising:
(a) providing an oil-in-alcohol containing consolute antifreeze composition with a cloud point between about 40° C. and about 125° C. in said heat exchange system;
(b) circulating said antifreeze composition through the heated first metal passageways and heating the composition to at least said cloud point to insolubilize and separate a portion of said oil from the antifreeze composition, and discharging heated two-phase antifreeze from the partially cooled first metal passageways;
(c) coating said first metal passageways with a portion of the separated oil, thereby inhibiting metal corrosion;
(d) circulating said heated two-phase antifreeze through the cooled second passageways, thereby recooling the two-phase antifreeze and coating said second passageways with a second portion of the separated oil, hereby inhibiting metal corrosion;

(e) continuously recirculating said two-phase antifreeze through said first metal passageways and said second passageways; and (f) discontinuing the continuous recirculating of step (e) and turning off the internal combustion engine and cooling said first metal passageways thereby cooling the antifreeze therein sufficiently to at least partially dissolve the separated oil in said first metal passageways and resolubilize the dissolved oil into the consolute antifreeze.

17. The method of claim 16 wherein an antifreeze composition reservoir is joined to said second passageways and said antifreeze has a cloud point of at least 65° C.

18. The method of claim 1 which comprises the additional step of allowing said antifreeze to cool down below said cloud point when said engine coolant system is not operating, thereby causing said oil to become re-solubilized in said antifreeze composition.

19. The method of claim 9 wherein said organophosphate ester is selected from the group defined by the following structural formulae:

  (I)

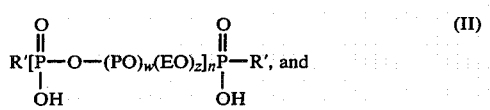  (II)

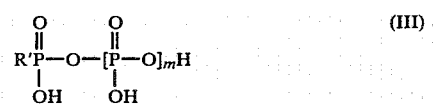  (III)

wherein $R' = [RO(PO)_x(EO)_y]$ wherein $R = H$ or alkyl, aryl, alkylaryl or arylalkyl having up to 24 carbon atoms
PO = Propylene oxide radical
EO = Ethylene oxide radical
$x = 1$ to 100
$y = 0$ to 100
$k = 1$ to 3, with the proviso that k can be 3 if at least one R' group is removed from the phosphate ester by hydrolysis prior to or during use
$n = 1$ to 100
$w = 0$ to 100 with the proviso that when w is $\geq 1$, x can be zero
$z = 0$ to 100
$m = 1$ to 10

20. The method of claim 16 wherein said cloud point is at least about 65° C. and wherein said heat exchange system additionally comprises an overflow tank and wherein said two-phase antifreeze enters said overflow tank from said second passageways after step(d).

21. The method of claim 1 wherein said coolant system includes an antifreeze reservoir tank and wherein said cloud point is at least about 65° C.

22. The method of claim 1 wherein said coolant system does not include an antifreeze reservoir tank.

23. The method of claim 1 wherein said oil is essentially soluble in said antifreeze composition at ambient temperature.

24. The method of claim 23 wherein said oil is polypropylene glycol.

25. An internal combustion engine cooling system comprising, in combination, a radiator connected by circulating pipe to an engine block of an internal combustion engine, said cooling system containing an oil-in-alcohol containing consolute antifreeze composition having a cloud point of at least about 40° C.

26. The cooling system of claim 25 additionally comprising an antifreeze reservior tank connected to said radiator and wherein said cloud point is at least about 65° C.

* * * * *